(12) United States Patent
Coing

(10) Patent No.: US 10,434,873 B2
(45) Date of Patent: Oct. 8, 2019

(54) INLET CHECK VALVE FOR A FILLER PIPE WELDED TO A LIQUID TANK

(71) Applicant: PLASTIC OMNIUM ADVANCED INNOVATION AND RESEARCH, Brussels (BE)

(72) Inventor: Jean-Francois Coing, Clairoix (FR)

(73) Assignee: PLASTIC OMNIUM ADVANCED INNOVATION AND RESEARCH, Brussels (BE)

(\*) Notice: Subject to any disclaimer, the term of this patent is extended or adjusted under 35 U.S.C. 154(b) by 0 days.

(21) Appl. No.: 15/746,999

(22) PCT Filed: Jul. 20, 2016

(86) PCT No.: PCT/EP2016/067299
§ 371 (c)(1),
(2) Date: Jan. 23, 2018

(87) PCT Pub. No.: WO2017/021151
PCT Pub. Date: Feb. 9, 2017

(65) Prior Publication Data
US 2018/0215253 A1    Aug. 2, 2018

(30) Foreign Application Priority Data
Jul. 31, 2015   (EP) .................. 15306253

(51) Int. Cl.
*B60K 15/01*     (2006.01)
*B60K 15/04*     (2006.01)
(Continued)

(52) U.S. Cl.
CPC .......... *B60K 15/04* (2013.01); *F16K 27/0227* (2013.01); *B60K 2015/0346* (2013.01);
(Continued)

(58) Field of Classification Search
CPC ............ B60K 15/04; B60K 2015/0346; B60K 2015/047; B60K 2015/0477; F16K 27/0227
(Continued)

(56) References Cited

U.S. PATENT DOCUMENTS 5,882,048 A *   3/1999   Kawasaki ............... B29C 49/20
                                                      285/319
7,704,440 B2 *  4/2010   Brandner ............ B29C 49/4802
                                                      264/510
(Continued)

FOREIGN PATENT DOCUMENTS

DE   10 2008 005717 A1   2/2009
FR      2 997 472 A1     5/2014
(Continued)

OTHER PUBLICATIONS

International Search Report and Written Opinion dated Sep. 26, 2016, in PCT/EP2016/067299 filed Jul. 20, 2016.

*Primary Examiner* — J. Gregory Pickett
*Assistant Examiner* — Niki M Eloshway
(74) *Attorney, Agent, or Firm* — Oblon, McClelland, Maier & Neustadt, L.L.P.

(57) ABSTRACT

An inlet check valve intended to be entirely located within an internal volume delimited by a liquid tank of a vehicle and a filler pipe welded to the tank, the filler pipe defining a downstream direction followed by a liquid filling the tank, and an upstream direction opposite thereto the inlet check valve comprising a tube and, at the upstream end of the tube, resilient means for adapting the form of the tube to the internal wall of the filler pipe. The inlet check valve comprises hook means for securing the tube to an internal wall of the filler pipe and prevent the inlet check valve from moving within the filler pipe. The tube bears a skirt ending (Continued)

with an edge which can merge with the filler pipe wall when the latter is welded to the tank, making the edge a seal part of the inlet check valve.

11 Claims, 7 Drawing Sheets

(51) Int. Cl.
*F16K 27/02* (2006.01)
*B60K 15/00* (2006.01)
*B60K 15/03* (2006.01)

(52) U.S. Cl.
CPC ............... *B60K 2015/047* (2013.01); *B60K 2015/0461* (2013.01); *B60K 2015/0477* (2013.01)

(58) Field of Classification Search
USPC ................................................ 220/86.2, 562
See application file for complete search history.

(56) References Cited

U.S. PATENT DOCUMENTS

| | | | | |
|---|---|---|---|---|
| 2002/0121517 A1* | 9/2002 | Aoki | ............... | B29C 45/16 220/4.14 |
| 2002/0130515 A1* | 9/2002 | Mlyajima | ............. | B29C 65/565 285/201 |
| 2003/0116202 A1 | 6/2003 | Krishnamoorthy et al. | | |
| 2004/0200846 A1* | 10/2004 | Miyajima | ............. | B60K 15/035 220/562 |
| 2005/0115973 A1* | 6/2005 | Brandner | ................ | B29C 49/22 220/562 |
| 2006/0088375 A1* | 4/2006 | Nishiyama | ............. | B60K 15/01 403/271 |
| 2007/0000928 A1* | 1/2007 | Nishiyama | ............. | B29C 65/02 220/562 |
| 2010/0194104 A1* | 8/2010 | Hennemann | ........ | F16L 37/0842 285/330 |
| 2012/0227829 A1* | 9/2012 | Doble | .................... | B60K 15/04 137/15.08 |
| 2012/0228292 A1* | 9/2012 | Doble | .................... | B60K 15/04 220/86.2 |

FOREIGN PATENT DOCUMENTS

| | | |
|---|---|---|
| JP | 2004-124903 A | 4/2004 |
| JP | 2004-345365 A | 12/2004 |
| JP | 2010-236567 A | 10/2010 |

* cited by examiner

INLET CHECK VALVE FOR A FILLER PIPE WELDED TO A LIQUID TANK

The present invention relates to an inlet check valve for a filler pipe welded to a liquid tank of a vehicle.

The terms "liquid tank" are intended to denote a sealed tank able to store liquid under diverse and varying environmental and usage conditions. An example of liquid tank is a fuel tank fitted to motor vehicles.

The terms "filler pipe" are intended to denote a sealed pipe having two openings and through which fluid flows in order to fill a tank, in a downstream direction. The upstream direction in the filler pipe is the direction opposite to the downstream direction.

Vehicles usually have many kinds of liquid tank on board, such as fuel tank, tank for urea storage, etc. These tanks are generally equipped with a filler pipe welded around an opening in a wall of the tank and through which the tank is filled. The inlet of the tank is preferably equipped with an inlet check valve to prevent the liquid flowing back to the filler pipe.

The terms "inlet check valve" or "check valve", also called "clack valve", "non-return valve" or "one-way valve", are intended to denote a valve that normally allows liquid to flow through it in only one direction. The inlet check valve can be made of plastic or metal or a combination of plastic and metal.

Various kinds of inlet check valve exist. The invention relates to a particular type of inlet check valve which is entirely located within an internal volume delimited by the tank and the filler pipe. With this type of inlet check valve, the access to the inlet check valve, once the filler pipe is in place on the tank, is no more possible.

One known method for installing such an inlet check valve in the filler pipe consists in inserting the check valve into the filler pipe in the upstream direction, until it has reached an appropriate location in the filler pipe. The filler pipe is then welded to the tank. The inlet check valve has resilient means at its upstream end (the end of the valve pointing toward the upstream direction), for instance having the form of flexible lips or petals, for adapting the shape of the upstream end of the inlet check valve to the internal shape of the filler pipe and allow a continuous flow of liquid when filling the tank. The resilient means presses against the internal wall of the filler pipe, which is slightly conical at this location to ensure the adaptation of the resilient means.

The inventors have identified a drawback of this method, which is that the check valve is not stably positioned in the filler pipe. Indeed, while pressing against the internal conical wall of the filler pipe, the resilient means act like a spring and tend to push the inlet check valve out of the filler pipe in the downstream direction. The inlet check valve is stopped by the tank and cannot move too far, thanks to an annular flange of the inlet check valve butting against the tank. But the inventors have noticed that the pushing of the inlet check valve against the tank, because of the resilient means, creates a counterforce applied to the filler pipe during welding of the filler pipe to the tank wall. Because of this counterforce, the force applied to the filler pipe during its welding to the tank is not entirely dedicated to merging the melted materials. One portion of this force is counterbalanced by the pushing of the inlet check valve and the remaining part of the force used for the welding is not controlled.

Consequently, it is difficult to guarantee a good positioning of the filler pipe around the opening of the tank during the welding, as well as the quality of the welding. In particular, if the pushing of the inlet check valve on the filler pipe is not rotationally symmetric, the filler pipe may imperceptibly misalign or tilt. The consequences of such misalignment of misorientation are multiple, such as poor mechanical weld, leak, malfunction of the fuel filling due to the bad orientation of the inlet check valve, etc. In practice, the welding is tested and the tank is scrapped if it does not meet the expectations.

It is therefore an object of the invention to provide an inlet check valve arranged in the filler pipe which does not disturb the welding of the filler pipe to the tank wall and which does not demonstrate the above drawbacks.

The invention relates to an inlet check valve for a filler pipe weldable to a liquid tank of a vehicle, the inlet check valve being adapted to be arranged entirely within an internal volume delimited by the liquid tank and the filler pipe, the inlet check valve being configured to allow liquid travelling through the filler pipe in a downstream direction to enter the liquid tank, the inlet check valve comprising a tube having an upstream end pointing toward an upstream direction opposite to the downstream direction, the upstream end of the tube comprising resilient means being adapted to conform to a portion of the internal wall of the filler pipe, wherein the inlet check valve comprises hook means for securing the tube to another portion of the internal wall of the filler pipe and prevent the inlet check valve from moving within the filler pipe in the downstream direction, the tube bearing a conical or cylindrical skirt which is connected to the tube by a radial flange, the conical or cylindrical skirt ending, in the direction of the tank, with an edge which can merge with the filler pipe wall when the latter is welded to the tank, making the edge a seal part of the inlet check valve.

In other words, the inlet check valve is intended to be entirely located within an internal volume delimited by a liquid tank of a vehicle and a filler pipe welded to the tank, the filler pipe defines a downstream direction, followed by a liquid filling the tank, and an upstream direction opposite to the downstream direction. The inlet check valve comprises a tube with an upstream end pointing toward the upstream direction and, at the upstream end, resilient means for adapting the form of the tube to the internal wall of the filler pipe. The inlet check valve comprises hook means for securing the tube to an internal wall of the filler pipe and prevent the inlet check valve from moving within the filler pipe in the downstream direction.

The hook means denote any means which are able to stably secure the tube to the internal wall of the filler pipe and prevent any movement of the inlet check valve inside the filler pipe which brings the valve closer to the tank. The stable securing prevents the inlet check valve from applying to the tank the counterforce generated by its resilient means pressing against the internal wall of the filler pipe. Therefore, the force applied to the filler pipe for its welding to the tank is entirely dedicated to the welding, which ensures a good positioning of the filler piper against the tank and secures the quality of the welding.

In addition, since the skirt ends with an edge which can merge with the filler pipe wall when the latter is welded to the tank, once the welding of the filler pipe wall and the tank takes place, a merging of the materials of the pipe wall and the fuel tank, but also the edge of the skirt, occurs.

Thanks to this, a bead integral with the wall of the filler pipe is formed at the junction between the fuel tank and the filler pipe and leaks are further prevented in this region. The inlet check valve can be partially or entirely located within the filler pipe. If it is not entirely inside the filler pipe, then it has a portion protruding in the tank.

The hooks means is made of metal or plastic or any other suitable material.

The welding area of filler pipe is made of a material which is compatible with the material of the welding area of the tank. Preferably, the filler pipe has a layer made of a material which is chemically compatible with a layer of the tank.

The resilient means preferably ensure the continuity of the tube to the internal wall of the filler pipe in order to guarantee a continuous flow or at least an unperturbed flow of liquid from the inlet of the filler pipe until the inside of the tank.

According to one advantageous embodiment of the invention, the hook means are resilient tabs able to bend inwardly when the inlet check valve is inserted upstream in the filler pipe and unfold outwardly when reaching a recess provided for in the internal wall of the filler pipe. The hook means can be resilient enough to be folded while the inlet check valve is pushed within the filler pipe but also rigid enough to resist from folding again while they are pressed against the recess, so that they are able to block the entire check valve from moving in the downstream direction. They preferably point toward the tank, i.e. the downstream direction, in both fold and unfold positions.

According to an advantageous embodiment, the hook means are teeth made of a material the hardness of which is greater than the hardness of the material the filler pipe is made of. The teeth, having a greater hardness, are able to grip the internal wall of the filler pipe and to resist from a force pushing them in the downstream direction.

According to another advantageous embodiment, the inlet check valve comprises an abutment at its downstream end, preventing the inlet check valve from moving in the upstream direction once it has reached its target location in the filler pipe. Thus, the inlet check valve is blocked in both directions by means of the abutment and the hook means in the targeted location.

Advantageously, the abutment is located on a seal part adapted to be welded to the filler pipe or to the tank during welding of the filler pipe to the tank. When the inlet check valve is secured in the targeted location, the seal part is in contact with the downstream end of the filler pipe or with the internal wall of the tank, in the vicinity of the weld area. Thus, when the contact zone between the filler pipe and the tank is heated to melt the material for welding, the seal part is also heated until being welded to the tank or to the filler pipe. The seal part is preferably made of a material which is chemically compatible with the material of the tank and the filler pipe of the welding area.

Advantageously, the abutment is intended to match with the internal wall of the filler pipe, for example by way of a recess, a shoulder or a locally reduced internal diameter of the filler pipe.

Advantageously, the abutment has a conical shape.

Alternatively, the abutment is a projection which protrudes from an external surface of the inlet check valve.

The present invention also relates to a set of a filler pipe which is to be welded to a liquid tank of a vehicle and an inlet check valve previously described.

According to an embodiment of the invention, the internal wall of the filler pipe has a recess for receiving the hook means of the inlet check valve where the inlet check valve is in its target location within the filler pipe.

According to another embodiment of the invention, the filler pipe is made of a multilayer plastic material having a fuel impermeable layer. The impermeable layer is preferably a layer of a resin impermeable to the fuel, such as EVOH for example (a copolymer of ethylene and partially hydrolyzed vinyl acetate).

According to an embodiment of the invention, the filler pipe has a treated external surface (by fluoration or sulphonation) which renders the filler pipe impermeable to fuel.

According to an embodiment of the invention, the liquid tank is a fuel tank made of a multilayer plastic material having a fuel impermeable layer.

According to an embodiment of the invention, the liquid tank is a fuel tank having a treated external surface (by fluoration or sulphonation) which renders the tank impermeable to fuel.

The present invention also relates to an assembly composed of a liquid tank of a vehicle and of the set previously described, the filler pipe being welded to the tank.

According to an embodiment of the invention, in the assembly, the inlet check valve is also welded to the tank.

The liquid tank and the filler pipe according to the invention are preferably made of plastic, that is to say, of a material comprising at least one synthetic resin polymer. All types of plastic may be suitable. Particularly suitable plastics come from the thermoplastic category. The term "thermoplastic" denotes any thermoplastic polymer including thermoplastic elastomers, as well as blends thereof. The term "polymer" denotes both homopolymers and copolymers (especially binary or ternary copolymers). Examples of such copolymers are, non-limitingly, random copolymers, linear block copolymers, other block copolymers and graft copolymers. One polymer which is often used is polyethylene. Excellent results have been obtained with high density polyethylene (HDPE).

The invention will be better understood through the following figures which illustrate certain practical aspects of the invention. The figures are only shown as examples and do not limit the scope of the present invention.

Figure 1:
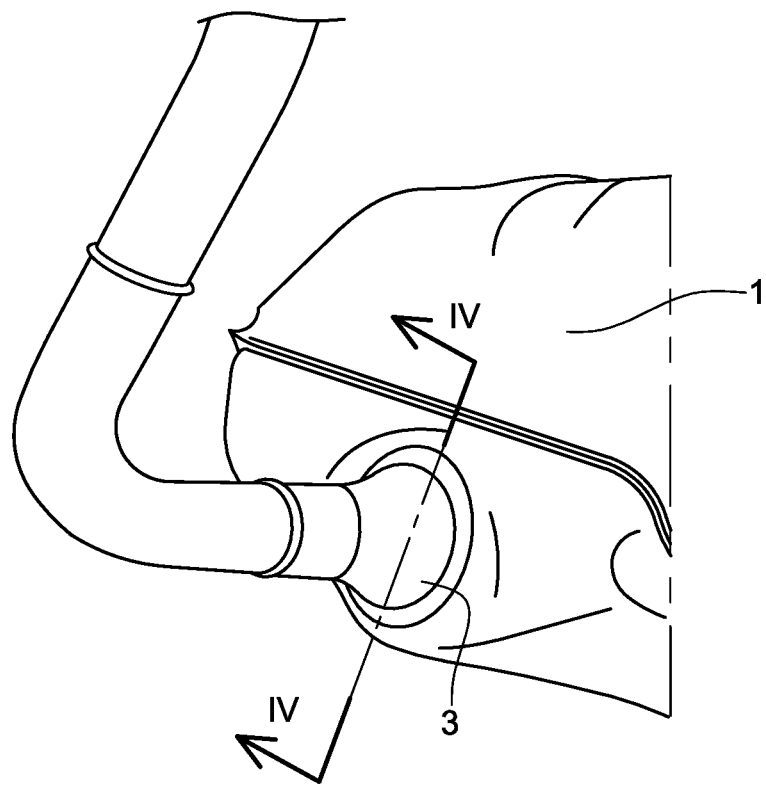
FIG. 1 is a global view of a tank with a filler pipe welded thereon.

Now, we refer to FIG. 1.

FIG. 1 shows a fuel tank 1 made of a plastic material, obtained by any known manufacturing process, such as an injection molding of two halves which are welded together to form an integral tank. As represented on FIG. 1, a lateral wall of the tank comprises an embossment 3, also called "spud", for receiving a filler pipe 5. The filler pipe is usually obtained by blow molding of a parison made of a plastic material which is fuel impermeable, to an extent defined by legal requirements, either thanks to its thickness as a monolayer wall, or thanks to the presence of a fuel impermeable layer included in its multilayer wall.

Figure 2:
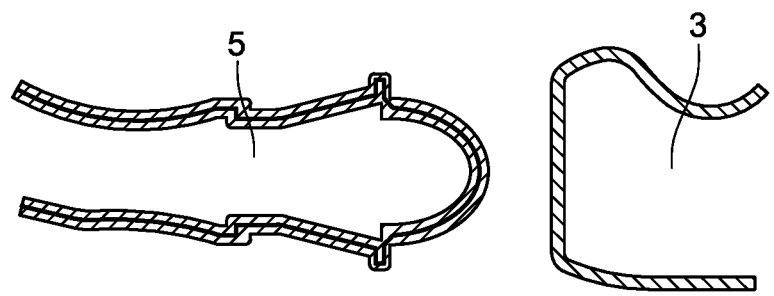
FIG. 2 shows a section of one end of the filler pipe and a part of the tank receiving the filler piper, just after molding.
Figure 3:
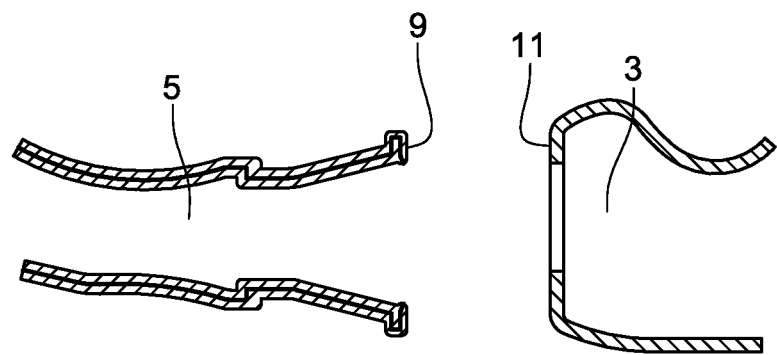
FIG. 3 is similar to FIG. 2, but the filler pipe and the tank part have been cut before assembling.

FIG. 2 shows the filler pipe 5 obtained by blow molding in front of the embossment 3 of the tank 1. At this stage, these two elements do not show any opening and have to be cut to drill a hole along their longitudinal axis. FIG. 3 shows the filler pipe 5 and the embossment 3 with their corresponding holes cut away, forming openings facing each other.

Figure 4:
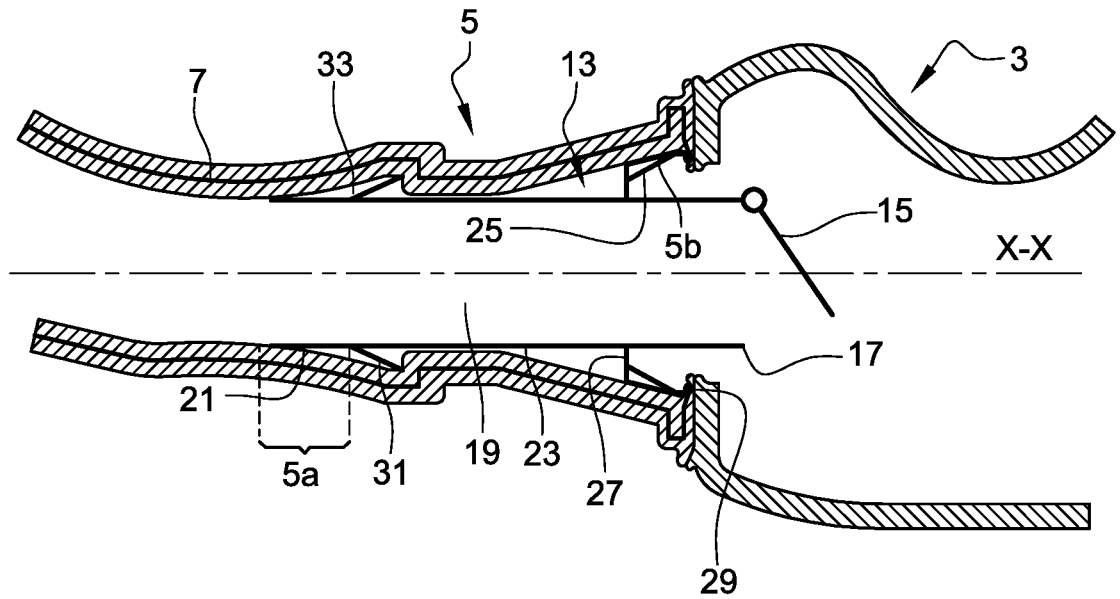
FIG. 4 is a longitudinal sectional view of an assembly of a liquid tank and a set of a filler pipe and an inlet check valve according to a first embodiment of the invention.

FIG. 4 is a longitudinal sectional view of the filler pipe 5 and embossment 3 along the cut plane IV-IV of FIG. 1. The wall of the filler pipe 5 includes a fuel impermeable layer 7 located roughly in the middle of the thickness of the filler pipe wall, whereas the embossment 3 has a monolayer wall (without any included fuel impermeable layer). The filler pipe 5 and embossment 3 are welded together. The welding results from a hot plate welding process, carried out when approaching the filler pipe 5 close to the embossment 3 in the direction parallel to the longitudinal axis X-X of the filler pipe 5. During the welding, the plastic material of both elements 3-5 merge together to provide a continuous medium between the seat 9 of the filler pipe 5 and the seat 11 of the embossment (FIG. 3).

The fuel impermeable layer 7 of the filler pipe has a shape which prevents leaks at the welding between the tank and the filler pipe. This shape is designed when blow molding of the filler pipe, by anticipating the deformation of the seat 9 during welding to the tank.

The sectional view of FIG. 4 also shows an inlet check valve 13 whose role is to prevent any flow of fuel in the upstream direction, opposed to the downstream filling direction, i.e. from the tank to the filler pipe. To that purpose, the inlet check valve 13 comprises a gate 15 at its downstream end 17 located inside the embossment 3. The opposed end of the inlet check valve, i.e. the upstream end 19, is equipped with petals 21. Depending on their shape, the petals 21 can sometimes be considered as teeth 21. Between its upstream end 19 and its downstream end 17, the inlet check valve 13 is made of a circular tube 23 having a diameter slightly smaller than the diameter of the filler pipe 5. In other possible embodiments, the tube 23 has a cross section which is not circular.

The petals 21 can be parts longitudinally cut in the wall of the tube 23, forming stripes extending parallel to the axis X-X and able to bend internally in a resilient way. The petals 21 urge against the internal wall of the filler pipe 5, at a location 5a where this internal wall is slightly conical. Thus, the petals 21 can adopt a shape similar to the shape of the internal wall of the filler pipe, which provides an almost continuous guiding for the flow of liquid going downstream in the filler pipe 5, in the direction of the tank 1.

In this embodiment, the tube 23 bears a conical skirt 25 which is connected to the tube 23 by a radial flange 27. The tube 23, radial flange 27 and conical skirt 25 can be one integral piece. In other embodiments, they can be separate elements linked together by any appropriate means. In the direction of the tank, the conical skirt 25 ends with an edge 29 which can stick to or merge with the filler pipe wall when the latter is welded to the tank, making the edge 29 a seal part of the inlet check valve.

In the vicinity of the petals 21, i.e. close to the upstream end 19, the inlet check valve 13 comprises hook means which are embodied here by resilient tabs 31. The resilient tabs 31 are able to bend inwardly and unfold externally by resilience.

We can see on FIG. 4 that the filler pipe 5 comprises a recess 33 in its internal wall for receiving the resilient tabs 31 in their unfolded position. The location of the recess 33 is determined so that when the resilient tabs 31 unfold in the recess, the conical skirt 25 rests against an internal conical 5b wall of the filler pipe.

Figure 4A:
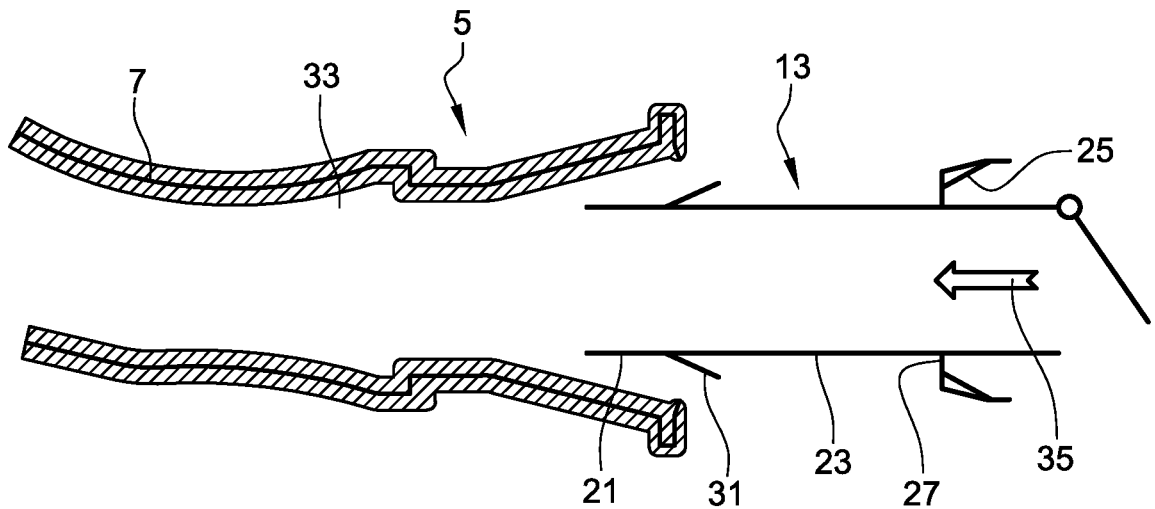
FIG. 4a is a longitudinal sectional view of the set of the filler pipe and the inlet check valve of FIG. 4, before being assembled.

FIG. 4a illustrates a first step of insertion of the inlet check valve 13 inside the filler pipe 5. The direction of insertion is shown by arrow 35. This insertion direction is the upstream direction relative to the filler pipe.

Figure 4B:
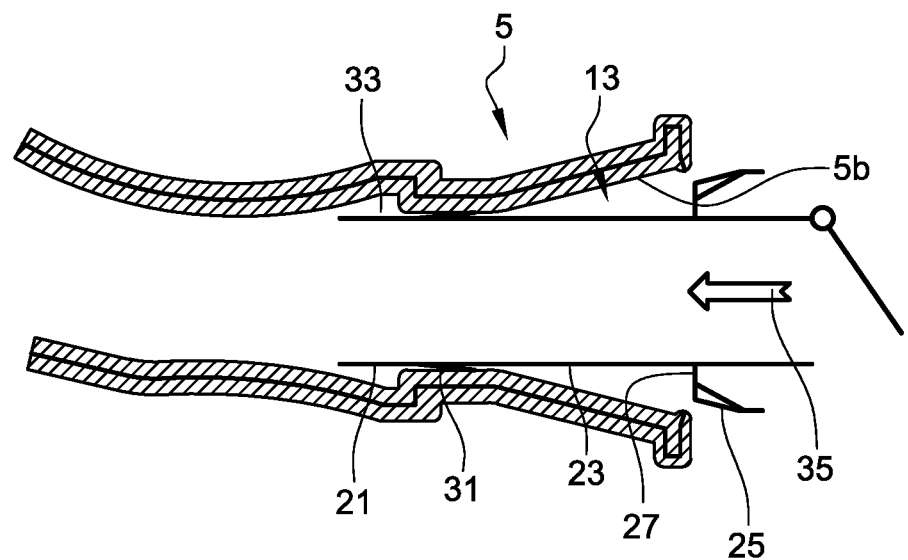
FIG. 4b is a longitudinal sectional view of the set of FIG. 4 while being assembled.

The inlet check valve 13 is inserted through the end hole of the filler pipe with the petals 21 in front of the filler pipe. As shown on FIG. 4b, during insertion of the inlet check valve 13, the resilient tabs 31 bend inwardly and reduce their external diameter down to the diameter of the tube 23. Thus, the resilient tabs 31 can pass the first conical wall 5b of the filler pipe and reach the recess 33.

Figure 4C:
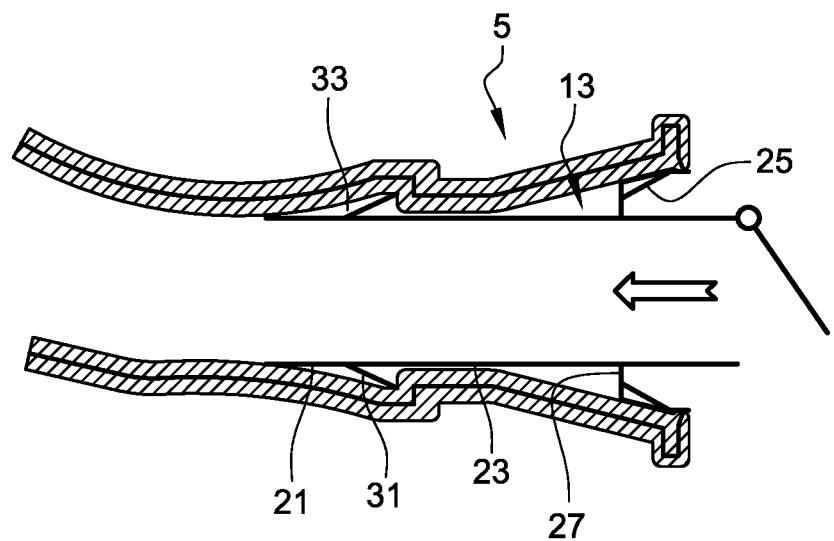
FIG. 4c is a longitudinal sectional view of the set of FIG. 4, once assembled.

When reaching the recess 33, as shown on FIG. 4c, the resilient tabs 31 unfold in the recess and their free ends abut against the bottom of the recess. Once unfolded, the resilient tabs 31 will not bend again inwardly, because there is no surface of the recess oriented to this end. To the opposite, the petals 31 fulfill a hook function, preventing the inlet check valve 13 from moving downstream, in the direction of the tank. In this position of the inlet check valve 13 in the filler pipe, the resilient tabs 31 are unfolded and the conical skirt 25 of the inlet check valve rests against the conical part 5b of the internal wall of the filler pipe.

The inlet check valve 13 cannot move inside the filler pipe, neither upstream, nor downstream.

Thanks to this kind of fixation of the inlet check valve in the filler pipe 5, it is possible to manipulate the filler pipe 5 and to approach said filler pipe close to the tank and to weld together the opposed seats 9 and 11 of these two elements.

The welding is carried out according to the well-known process of hot plate welding. As shown on FIG. 4, the result of the welding is a merging of the materials of the two opposed seats 9 and 11, as well as merging of the edge 29 of the conical skirt 25, which forms a bead integral with the wall of the filler pipe.

The shapes of the seats 9-11 and edge 29 are designed so that the result of the welding is optimized, as regards leaks at the junction between the fuel tank and the filler pipe.

Figure 5:
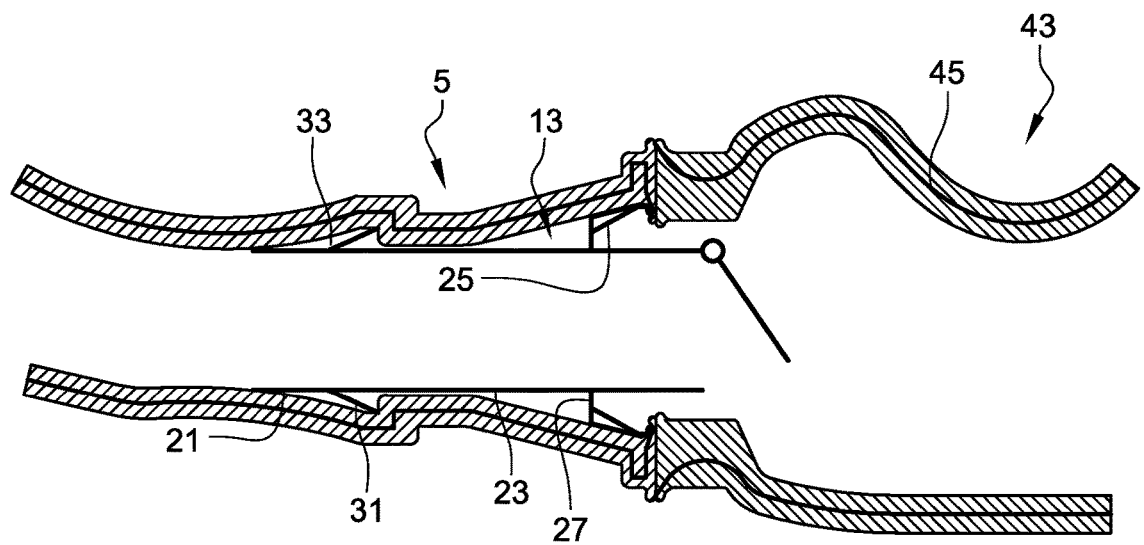
FIG. 5 is a longitudinal sectional view of an assembly, similar to the one of FIG. 4, of a liquid tank and a set of a filler pipe and an inlet check valve according to a second embodiment of the invention.

In the embodiment of FIG. 5, the filler pipe 5 and inlet check valve 13 are identical but the embossment 43 is made of a multilayer material including a fuel impermeable layer 45. The location of the fuel impermeable layer 45 in the embossment is obtained by an appropriate design of the mold used to form the embossment 43. In this case, the embossment 43 can be obtained with one half of the tank, by blow molding of a multilayer parison. The embossment 43 is cut to form the seat 11 and the opening facing the filler tank, at a location where the fuel impermeable layer 45 is close to the external face of the embossment. This improves the tightness of the welding in this example, but another choice can be done by the skilled person, depending on the global geometry of the tank and filler pipe.

Figure 6:
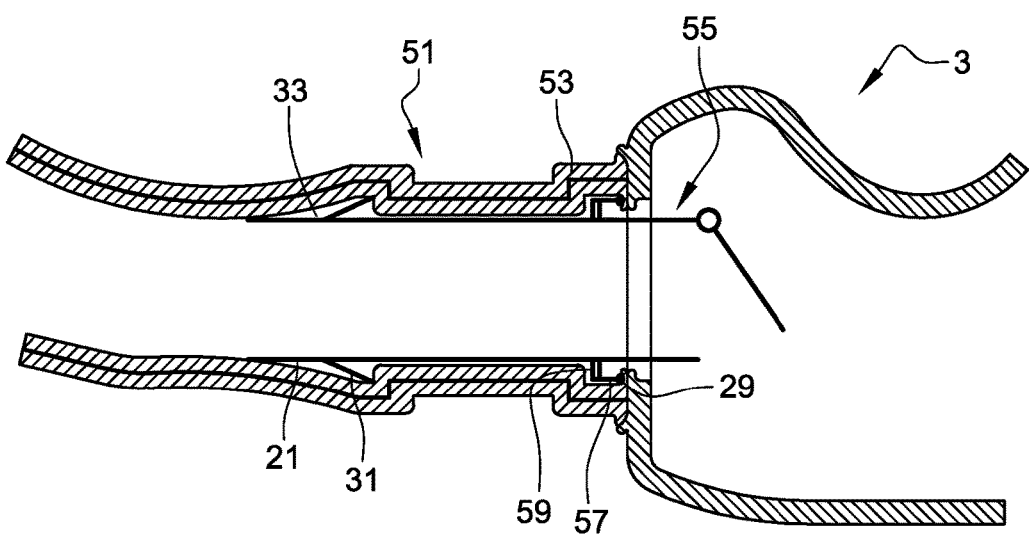
FIG. 6 is a longitudinal sectional view of an assembly, similar to the one of FIG. 4, of a liquid tank and a set of a filler pipe and an inlet check valve according to a third embodiment of the invention.

In the embodiment of FIG. 6, the embossment 3 has the same shape as in FIG. 4. The filler pipe 51 has a different shape because it does not comprise a first conical internal wall in the vicinity of the seat 9. It globally has a tubular shape from the internal recess 33 to the welding seat 9.

Instead of a conical part, the filler pipe 51 has an annular shoulder 53.

The inlet check valve 55 also differs from the one of the previous figures in that it has a skirt 57 which is not conical but cylindrical. The skirt 57 is connected to the tube 23 by a radial flange 59.

As in the previous embodiments, the location of the recess 33 in the filler pipe 51 is determined with the purpose that when the resilient tabs 31 of the inlet check valve 55 unfold inside the recess 33, the skirt 57 rests against the annular shoulder 53. In this embodiment, the abutment of the inlet check valve in the filler pipe in the insertion direction, i.e. in the upstream direction inside the filler pipe 51, results from the abutment of the radial flange 59 against the radial wall of the annular shoulder 53.

The cylindrical skirt 57 ends with an edge 29 located in the vicinity of the end of the filler pipe when the inlet check valve is thus positioned in the filler pipe.

Figure 6A:
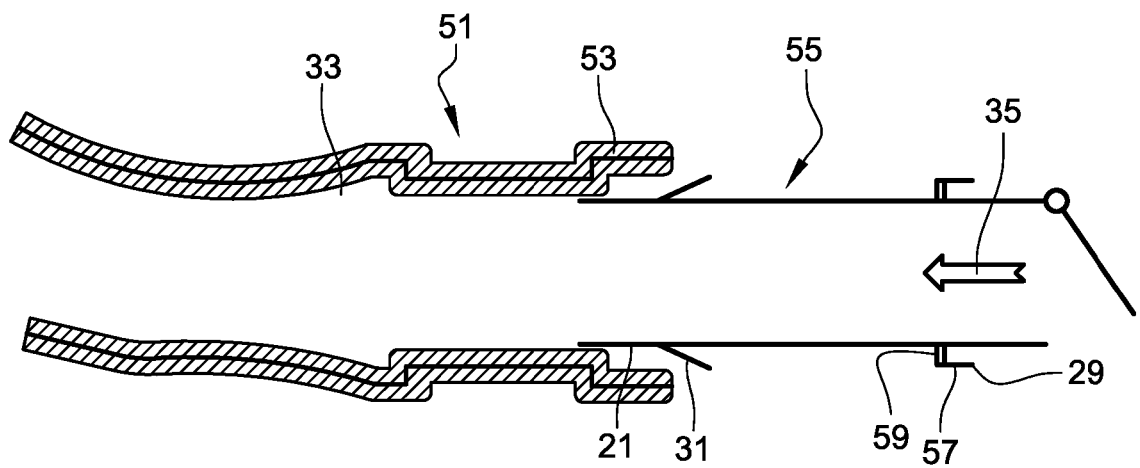
FIG. 6a is a longitudinal sectional view of the set of the filler pipe and the inlet check valve of FIG. 7, before being assembled.
Figure 6B:
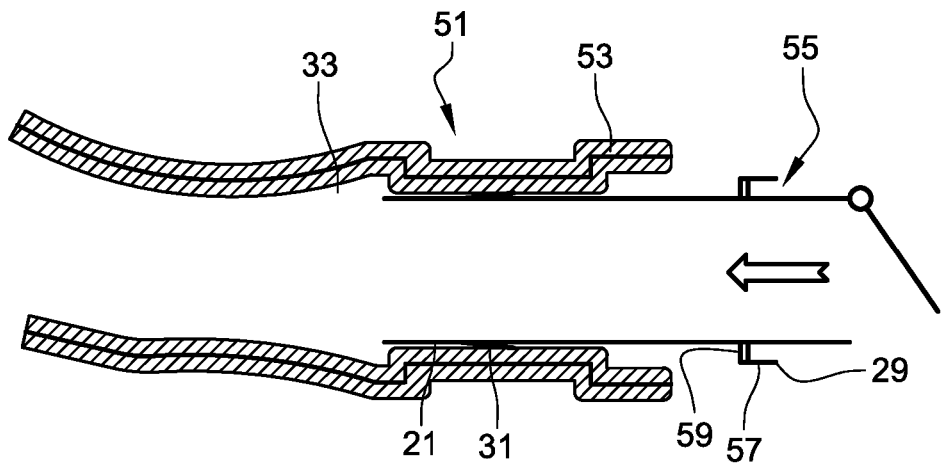
FIG. 6b is a longitudinal sectional view of the set of FIG. 7 while being assembled.
Figure 6C:
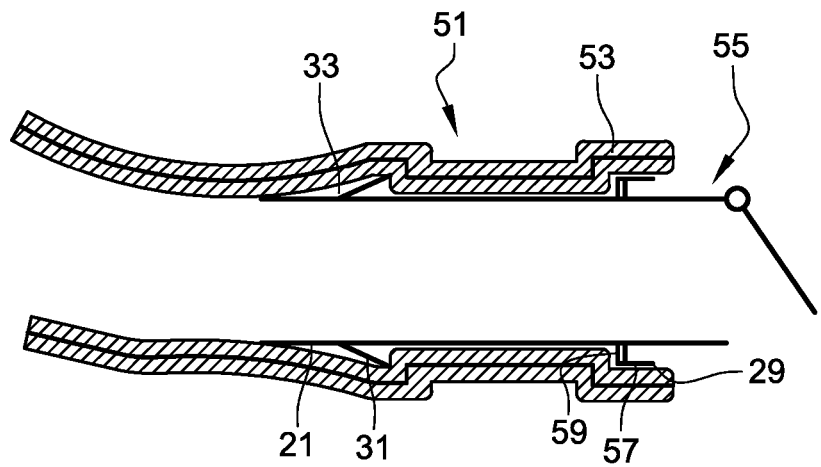
FIG. 6c is a longitudinal sectional view of the set of FIG. 7, once assembled.

FIGS. 6a, 6b and 6c illustrate three steps of insertion of the inlet check valve 55 inside the filler pipe 51.

In FIG. 6a, the inlet check valve is inserted with its petals 21 orientated in the direction of the filler pipe and the inlet check valve is moved in the direction indicated by the arrow 35, which is the upstream direction. FIG. 6b illustrates an intermediate position of the inlet check valve 55 during its movement inside the filler pipe 51. The resilient tabs 31 bend inwardly to reach the diameter of the filler pipe and allow progression of the inlet check valve in the direction of the arrow 35.

On FIG. 6c, the radial flange 27 has reached the radial wall of the shoulder 53. This abutment stops the progression of the inlet check valve and the resilient tabs 31 have reached the recess 33 and unfold externally to block the inlet check valve 55 in the downstream direction. The inlet check valve 55 is thus affixed inside the filler pipe 51 with the petals 21 urging against the internal wall of the filler pipe 51.

As already explained, once the inlet check valve has been affixed inside the filler pipe 51, the filler pipe 51 can be held and welded to the tank through a usual hot plate welding process. During the welding, the plastic materials of the seats 9 and 11 and the plastic material of the edge 29 merge together to form an integral piece of plastic material, thus enabling a leak type fixation of the filler pipe to the tank.

Figure 7A:
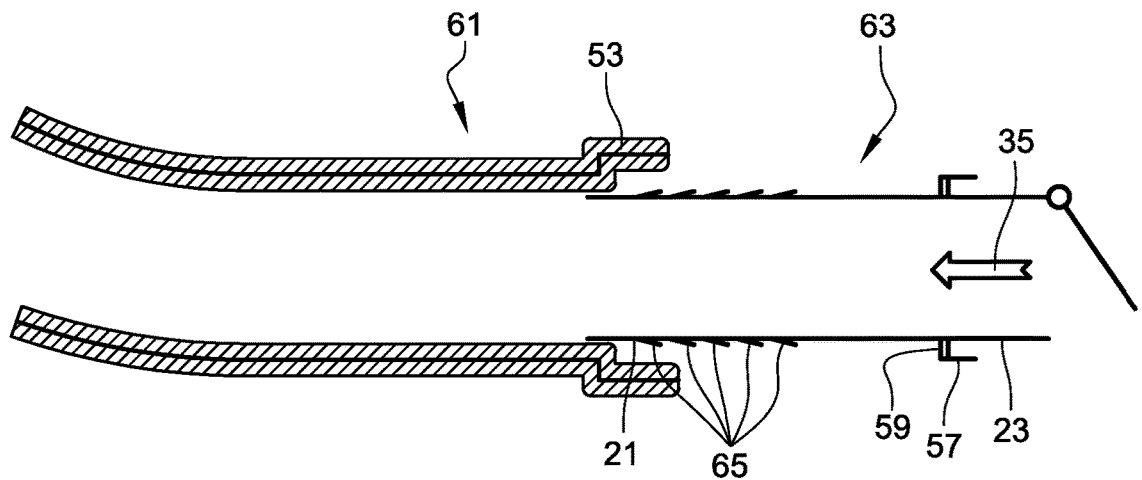
FIG. 7a is a longitudinal sectional view of a set of a filler pipe and an inlet check valve according to a fourth embodiment of the invention, before being assembled.
Figure 7B:
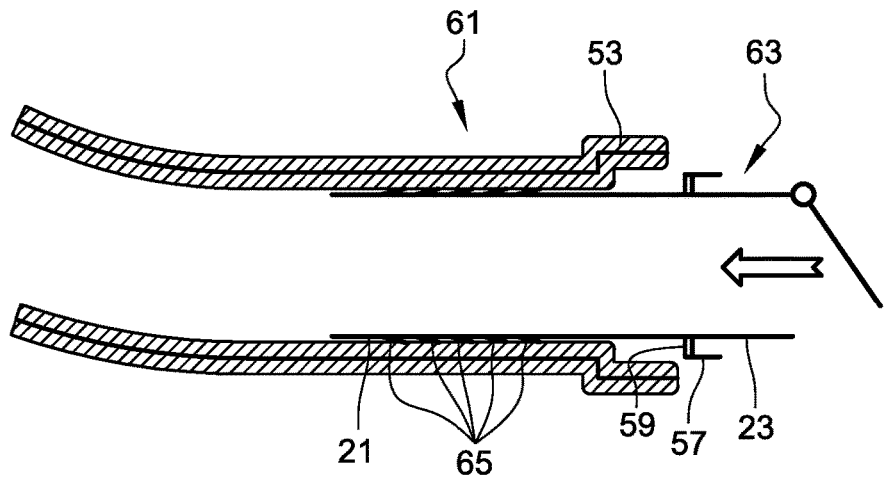
FIG. 7b is a view similar to FIG. 7a, during assembling of the set.
Figure 7C:
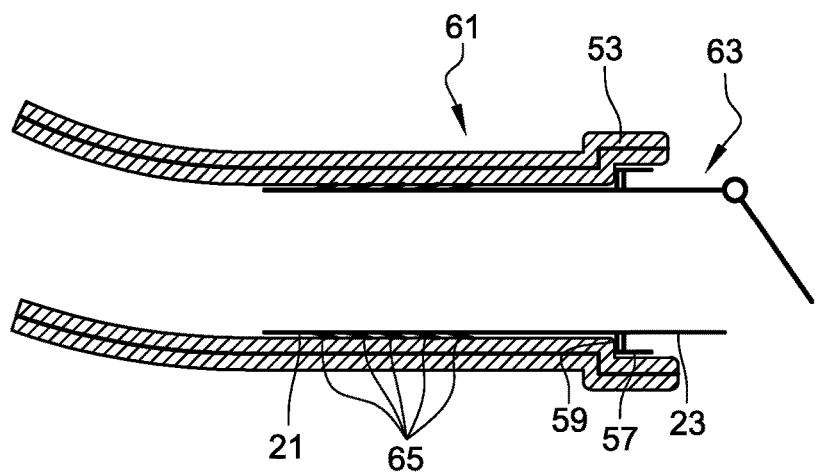
FIG. 7c is a view similar to FIG. 7a, the set being assembled.

In the embodiment of FIGS. 7a-7c, the filler pipe 61 has a simpler shape: it is a cylindrical tube all along its length, without any internal recess, but at its end where it comprises an annular shoulder 53.

The inlet check valve 63 consists in a tube 23, with an annular flange 59 and a cylindrical skirt 57. Instead of the resilient tabs of the preceding embodiments, the inlet check valve 63 comprises teeth 65 forming hook means. The teeth 65 are made of a material the hardness of which is greater than the hardness of this material of the filler pipe wall. For instance, the ratio of these two harnesses is preferably superior to 40%.

As shown on FIG. 7a, the inlet check valve is inserted inside the filler pipe 61 in the direction indicated by the arrow 35. During insertion, as shown on FIG. 7b, the teeth 65 slide on the internal wall of the filler pipe. Their hardness is higher than the hardness of the internal wall of the filler pipe but their form does not prevent the progression of the inlet check valve in the upstream direction, by scratching or scuffing the internal wall of the filler pipe, whereas the form of the teeth 65 would not allow a movement of the inlet check valve 63 in the opposite direction, i.e. downstream, because of the griping of the teeth 65 in the internal wall of the filler pipe.

Once the inlet check valve 63 has reached his final position, as shown on FIG. 7c, the inlet check valve cannot move in both directions because it is blocked by the radial flange 59 resting against the annular shoulders 53 in the upstream direction and by the teeth 65 gripping the internal wall of the filler pipe 61 in the downstream direction.

As in the preceding embodiments, the filler pipe can then be welded to the tank without any need for holding the inlet check valve, because the latter is naturally positioned inside the filler pipe 61 and optimally located relative to the tank and to welding seats 9 and 11.

Figure 8A:
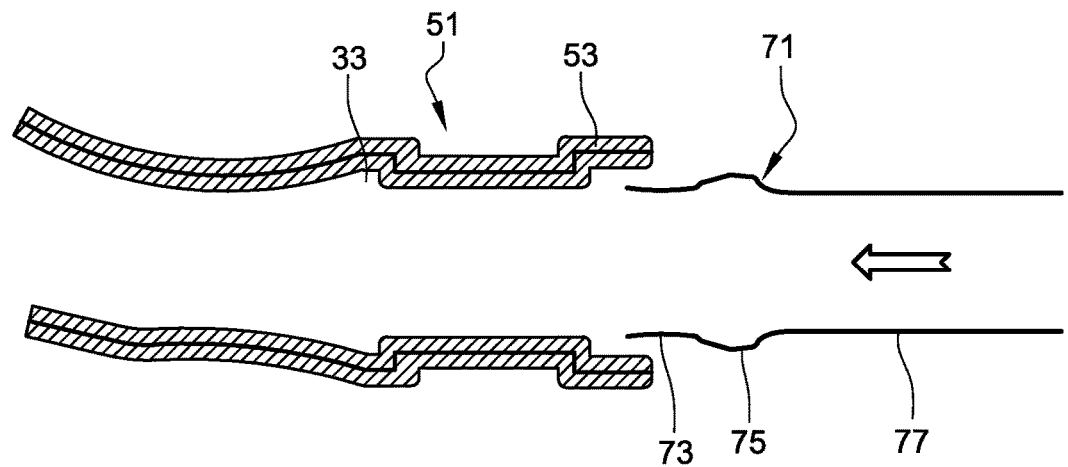
FIG. 8a is a longitudinal sectional view of a set of a filler pipe and an inlet check valve according to a fifth embodiment of the invention, before being assembled.
Figure 8B:
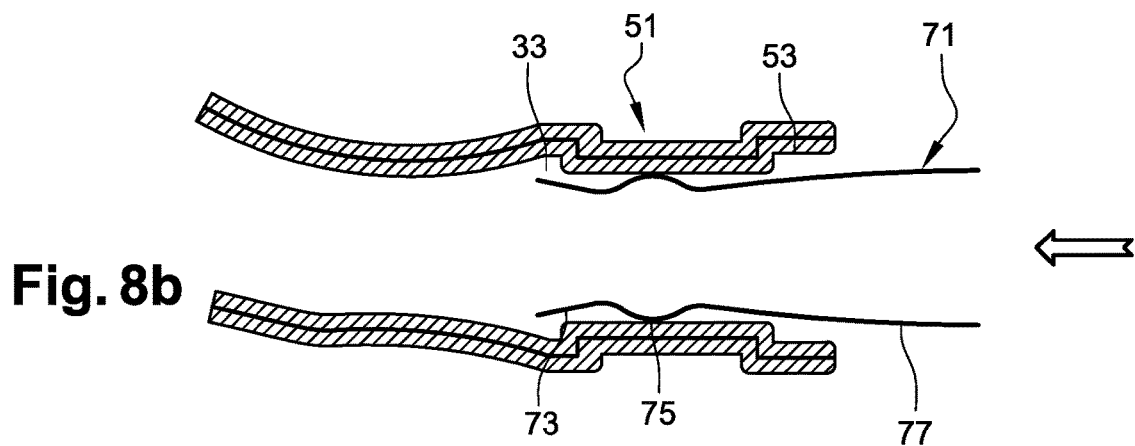
FIG. 8b is a view similar to FIG. 8a, during assembling of the set.
Figure 8C:
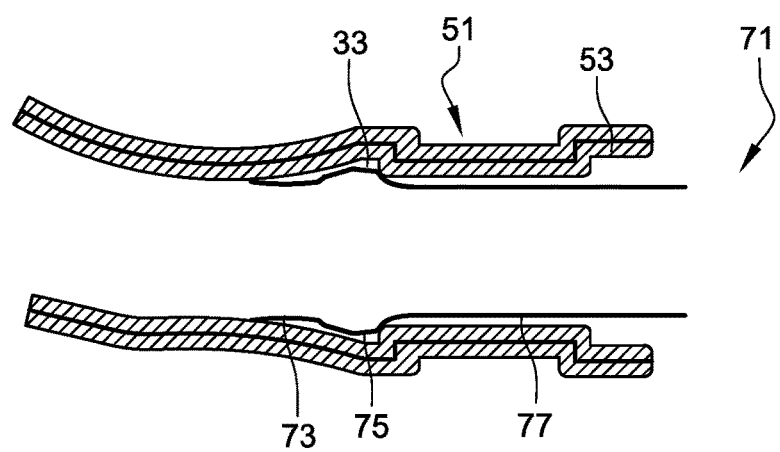
FIG. 8c is a view similar to FIG. 8a, the set being assembled.

In the embodiment of FIGS. 8a-8c, the filler pipe is the same as in FIGS. 6-6c, but the inlet check valve 71 has a different shape. Inlet check valve 71 is an integral part with different sections fulfilling the previously described means: petals 73, embossed section 75, tube 77. There is no radial flange, nor flange on this very simple inlet check valve.

The wall of the inlet check valve is resiliently deformable, so that the embossed section 75 can reduce its diameter down to the diameter of the straight portion of the filler pipe, as shown on FIG. 8b, and recover its initial shape to fill the recess 33, as shown on FIG. 8c.

The invention is not limited to the above embodiments and other embodiments exist and will appear clearly to one skilled in the art. For example, the filler pipe and the fuel tank can both be multilayer structures.

Lexicon:
FIGS. 1-4c
Fuel tank 1
Embossment 3
Filler pipe 5
Plan IV-IV sur FIG. 1
Fuel impermeable layer 7 of the filler pipe 5
Seat 9 filler pipe
Seat 11 of the embossment
Inlet check valve 13
Gate 15
Downstream end 17 of the ICV
Upstream end 19 of the ICV
Teeth 21 (or petals)
Tube 23
Conical skirt 25
Radial flange 27
Edge 29 of the skirt
Resilient tabs 31
Recess 33
Arrow 35

FIG. 5
Embossment 43
Fuel impermeable layer 45 (embossment 43)
FIG. 6
Filler pipe 51
Annular shoulder 53
Inlet check valve 55
Cylindrical skirt 57
Radial flange 59
FIG. 7-7c
Filler pipe 61
Inlet check valve 63
Teeth 65
FIGS. 8a-8c
Inlet check valve 71
Petals 73
Embossed section 75
Tube 77

The invention claimed is:

1. An inlet check valve for a filler pipe weldable to a liquid tank of a vehicle,
   the inlet check valve to be arranged entirely within an internal volume delimited by the liquid tank and the filler pipe, the inlet check valve being configured to allow liquid travelling through the filler pipe in a downstream direction to enter the liquid tank,
   the inlet check valve comprising:
      a tube having an upstream end pointing toward an upstream direction opposite to the downstream direction, the upstream end of the tube comprising a resilient structure to conform to a portion of an internal wall of the filler pipe; and
      a hook to secure the tube to another portion of the internal wall of the filler pipe and prevent the inlet check valve from moving within the filler pipe in the downstream direction,
   wherein the tube bears a conical or cylindrical skirt which is connected to the tube by a radial flange that is insertable inside the filler pipe, the conical or cylindrical skirt ending, in a direction of the tank, with an edge which is mergeable with the filler pipe wall when the latter is welded to the tank, making the edge a seal part of the inlet check valve.

2. The inlet check valve according to claim 1, wherein the hook includes resilient tabs that are bendable inwardly when the inlet check valve is inserted in the filler pipe and unfoldable outwardly when reaching a recess provided for in the internal wall of the filler pipe.

3. The inlet check valve according to claim 1, wherein the hook includes teeth made of a material, a hardness of which is greater than a hardness of a material the filler pipe is made of.

4. The inlet check valve according to claim 1, wherein the inlet check valve comprises an abutment at its downstream end, preventing the inlet check valve from moving in the upstream direction once it has reached its target location in the filler pipe.

5. The inlet check valve according to claim 4, wherein the abutment is located on a seal part to be welded to the filler pipe or to the tank during welding of the filler pipe to the tank.

6. The inlet check valve according to claim 4, wherein the abutment has a conical shape.

7. A set comprising:
   a filler pipe which is to be welded to a liquid tank of a vehicle; and
   the inlet check valve according to claim 1.

8. The set according to claim 7, wherein the internal wall of the filler pipe has a recess to receive the hook of the inlet check valve where the inlet check valve is in its target location within the filler pipe.

9. The set according to claim 7, wherein the filler pipe is made of a multilayer plastic material having a fuel impermeable layer.

10. An assembly comprising:
    a liquid tank of a vehicle; and
    the set according to claim 7,
    wherein the filler pipe is welded to the tank.

11. The inlet check valve according to claim 1, wherein the radial flange is disposed at a downstream side of the tube.

* * * * *